United States Patent [19]
Cailliot

[11] 3,787,057
[45] Jan. 22, 1974

[54] TAPE RECORDER UTILIZING RESILIENT TAPE AND CARTRIDGE HAVING NO MOVING PARTS

[76] Inventor: Serge Cailliot, 16 Avenue Hache, Paris, France

[22] Filed: Mar. 30, 1970

[21] Appl. No.: 23,745

[30] Foreign Application Priority Data

Mar. 31, 1969 France .............................. 6909731

[52] U.S. Cl. .............................................. 274/4 B
[51] Int. Cl. .............................................. G11b 5/00
[58] Field of Search .... 274/4 B, 11 B; 242/55.19 A, 242/55.21

[56] References Cited

UNITED STATES PATENTS

| | | | |
|---|---|---|---|
| 3,488,013 | 1/1970 | Sasaki | 242/55.21 |
| 3,445,116 | 5/1969 | Knox | 274/4 A |
| 2,085,439 | 6/1937 | Morlock | 242/55.21 |
| 2,385,595 | 9/1945 | Woitsheck | 274/43 |
| 3,244,471 | 4/1966 | Mead | 242/55.21 |
| 3,485,963 | 12/1969 | Murata | 274/4 C |
| 2,982,489 | 5/1961 | Horres | 242/55.19 A |
| 3,524,651 | 8/1970 | Ketzer | 274/4 E |
| 3,126,162 | 3/1964 | MacKenzie | 242/55.19 A |

FOREIGN PATENTS OR APPLICATIONS

| | | | |
|---|---|---|---|
| 466,058 | 5/1937 | Great Britain | 274/11 B |
| 293,730 | 12/1953 | Switzerland | 242/55.19 A |

*Primary Examiner*—Harry N. Haroian
*Attorney, Agent, or Firm*—Brisebois & Kruger

[57] ABSTRACT

Tape recorder comprising a cartridge within which an endless resilient tape is coiled about a stationary post, and a main assembly comprising a driving spindle, pressure roller, a magnetic head, and means for urging said pressure roller and head against said tape, and thereby pressing said tape against said driving spindle.

13 Claims, 11 Drawing Figures

PATENTED JAN 22 1974 3,787,057

TAPE RECORDER UTILIZING RESILIENT TAPE AND CARTRIDGE HAVING NO MOVING PARTS

SUMMARY OF THE INVENTION

This invention relates to a small cartridge holding an endless magnetic tape. This cartridge is adapted to cooperate with driving mechanism and may be connected thereto by suitable snap-fastening means. The motor of the driving mechanism turns a driving spindle which passes through a hole in the cartridge, and this mechanism also comprises a pivotally mounted device which is actuated by a lever and adapted to simultaneously press a magnetic head against a reading station in the cartridge (for reading purposes, for recording purposes, or in order to erase sound signals of the magnetic strip), and a pressure foot against the part of the strip which must be driven by the driving spindle.

The small cartridge for an endless magnetic tape according to the present invention is adapted to permit the tape to travel in either direction regardless of the position of the cartridge. This result is obtained in part by eliminating from this cartridge any rotating table and all the driving rollers required to support such a necessarily horizontal table, and on the other hand because of the stiffness of the tape used. This cartridge accordingly leads to a very simple arrangement according to which the coil formed by the endless magnetic tape simply rests on the flat bottom of the cartridge where it is held in position by two round posts, usually of different heights, or possibly by a single oval post having the height of the longer post, so that the tape wound up into a coil, as well as the connecting loop between the inner and outer turns of this coil (which passes over the top thereof via a passageway near the periphery of the cartridge), cannot be siezed between adjacent turns.

The fact that this cartridge operates with an endless magnetic tape poses problems with respect to differences between the angular speeds of the innermost turns and the outermost turns of the coil, which are required, in order to maintain a constant linear speed and permit the loop which connects the innermost and outermost turn to be kept at a constant tension. This problem has been solved by using a coil having only a relatively small number of turns so that the difference between the diameters of the innermost and outermost turns is small, and especially by using a springy tape having a resilience which does not exist in the case of conventional magnetic tapes. This resilience may be obtained by increasing the thickness and stiffness of the support for the magnetic layer or by providing longitudinal ribs on the tape. The magnetic paths are located on the surfaces of these ribs turned toward the magnetic head so as to assure good contact between the head and the magnetic paths. Alternatively the longitudinal edges of this tape may be folded over.

Thanks to the springiness resulting from the use of this resilient tape, the new cartridge may, as has been pointed out, operate in either direction, in view of the absence of any rotating table or the driving rollers required to support such a necessarily horizontal table. This makes possible correct operation regardless of the position of the cartridge. The resilient tape is simply positioned between the two halves of the cartridge casing which are adapted to permit automatic engagement, in that two external projections on the casing half acting as the cover embrace the other casing half. Another characteristic of the present invention resides in the provision of notches on the resilient tape, which notches, by reason of the stiffness of the magnetic tape, are adapted to cooperate with a device for disengaging the starting lever of a mechanism for driving the tape, so as to automatically stop it at places determined by the tape, which have been marked in advance.

The endless magnetic tape, before being introduced into the cartridge, is wound up on a mandrel of suitable diameter adapted, in view of the resilience of the tape and the radius of curvature of the different turns constituting the coil, to produce after its introduction into the cartridge, spaced turns like those of a spiral clock spring.

Independently of the device for automatically starting the strip, which device comprises a latch adapted to permit the apparatus to be manually stopped at any moment, this mechanism may comprise, in a conventional manner, a device for selecting different magnetic paths, as will be hereinafter seen.

The characteristics of the present invention will be better understood from a reading of the following description of one embodiment of a cartridge utilizing an endless magnetic tape according to the invention, in cooperation with a mechanism for starting this cartridge, which embodiment is given purely by way of illustration and example, with reference to the accompanying drawings, in which.

Figure 1:
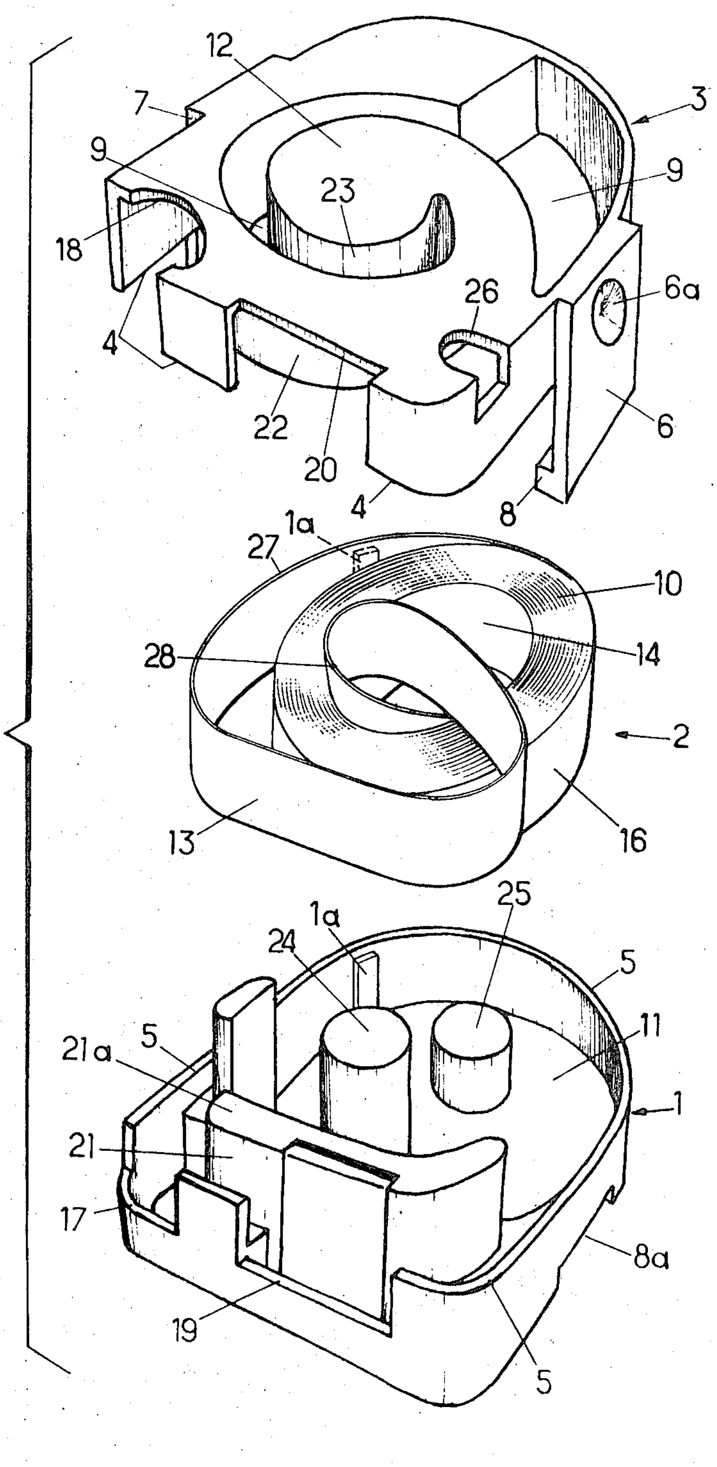
FIG. 1 is an exploded perspective view of the entire cartridge and the endless magnetic tape adapted to be inserted therein, showing the connecting loop of the tape coil which extends over the coil itself.

The cartridge shown on FIG. 1 comprises two casing halves, one of which acts as a socket in which the magnetic tape 2 is mounted, and the other of which 3 has its lower edge 4 resting on the upper edge 5 of the casing half 1. The casing half 3 carries two projections 6 and 7 which terminate in hooks 8 adapted to snap into notches 8*a* in the lower part of the sidewall of the casing half 1.

The casing half 3 has a lower part defined by a surface 9 which overlies the top 10 of that part of the magnetic tape 2 which is wound into a coil when this tape is inside the casing half 1 and rests on the bottom 11 of that casing half. Moreover, the casing half 3 comprises a higher part which terminates in a surface 12 beneath which is seated the raised part 13 forming the connecting loop between the inner turn 14 and the outer turn 15 of that part of the tape 16 which is wound into said coil. The casing half 1 comprises a lateral opening 17 in communication with a corresponding lateral opening 18 in the casing 3, which opening extends into the surface 12. These openings 17 and 18 are adapted to receive the driving spindle of the mechanism. The recesses 19 and 20 in the casing halves 1 and 3 receive a magnetic head which is pressed against the central part of the connecting loop 13 of the said magnetic strip opposite a post 21 which acts as a reading station and is fixed to the casing half 1. The upper part 21*a* of the post 21 projects above the edges 5 of the casing half 1. The post 21 is positioned in front of a partition 22 in the casing half 3 which is generally circular in shape and perpendicular to the surface 12. ONe surface of this partition may be seen through the opening 20 and the other surface defines one wall of a recess the remainder of which is defined by the wall 23. Inside the space defined by said wall 23 is seated the post 24 which projects above the edges 5 and serves to hold the connecting loop 13 in position. This post 24 cooperates with a shorter post 25 which extends upwardly to the same height as the edges 5, to hold the inner part of the coil 16.

The use of two posts to hold this coil, or possibly a single oval post, makes it possible to avoid any siezing of the inner turn of the coil against said posts as may be the case when a cylindrical post is used having a diameter substantially equal to that of the inner coil of the coil in question.

This inner turn may thus have an elliptical shape which facilitates the unwinding of the resilient tape and the transmission of the said springy effect from one end of the tape to the other, regardless of the direction in which the tape is traveling.

It will be seen that the casing half 3 comprises another opening 26 adapted to admit a feeler for the stopping device, which will be hereinafter described, particularly in connection with FIG. 10.

The casing half 1 further comprises internally at its rear portion a guide finger 1a for the back portion of the magnetic tape 2, which is shown on FIG. 1, allowing to compensate for the forward pull applied in the normal direction of reading of tape 2 upon the entire coil 16 provided by the said tape.

Figure 2:
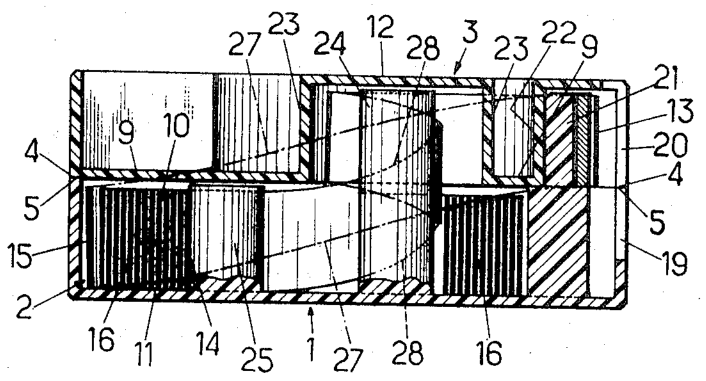
FIG. 2 is a vertical section through the cartridge and the endless magnetic tape therein taken in its plane of symmetry and passing through the center of the reading station of said strip.

FIG. 2 shows the upper surface 10 of the coil 16, the partition overlying this upper surface, the two opposed sides of the wall 23 of the upper casing half 3, the wall 22, the openings 19 and 20 adapted to permit reading of the part 13 of the strip. The lower opening 19 receives the reading head only when this reading head is positioned to read a magnetic path on the lower part of the said raised portion 13.

The portion of the raised loop 13 coming from the outside of the coil is connected to the part being read by an inclined portion, the edges 27 of which are shown in FIG. 2 in phantom lines.

This portion 13 passes around the post 21 fixed to the lower casing half and continues to the upper part of the casing.

The edges of the descending portion of the connecting loop, after it has turned around the post 24 are shown in broken lines at 28 as it approaches the inside of the coil.

Figure 3:
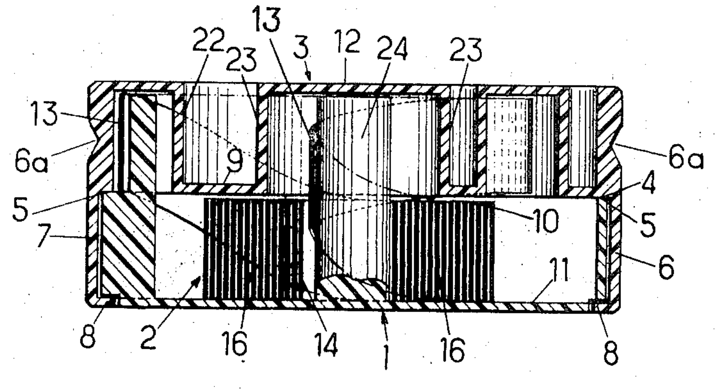
FIG. 3 is a vertical section through the same cartridge and strip taken in a plane perpendicular to the plane of FIG. 2 and passing substantially through the two openings for receiving the snap-fastening means for attaching the cartridge to the drive means.

In like manner the transverse section of FIG. 3 shows the post 24, a bottom 9 in the upper casing half, and three recesses corresponding to the spaces between the walls 22 and 23.

The connecting loop 13 is shown in two places in the upper part of the figure. At the left is the part of the loop 13 attached to the outer part of the coil, and at the right is the part of this loop between the post 21 and the post 24.

If the driving mechanism of the cartridge is now examined, and this is shown in particular on FIGS. 4–9, it will be seen that this mechanism comprises a motor and reduction gear 29 driving a wheel 31 through a belt 30. This wheel is divided with projections 31*a* the purpose of which will be hereinafter explained.

Figure 8:
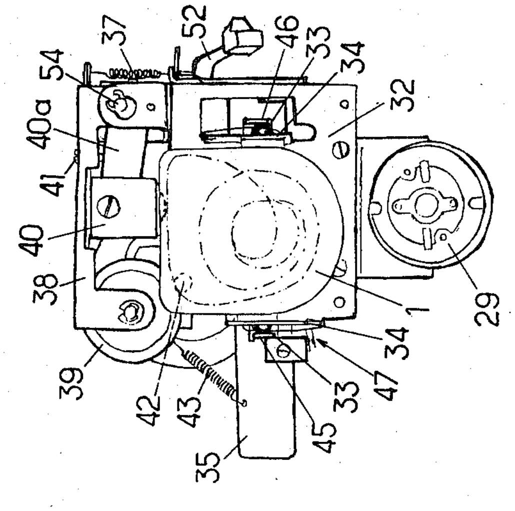
FIGS. 8 and 9 are views similar to FIGS. 5 and 6 taken after mounting of the cartridge on the driving mechanism and latching of the tape drive in position.
Figure 9:
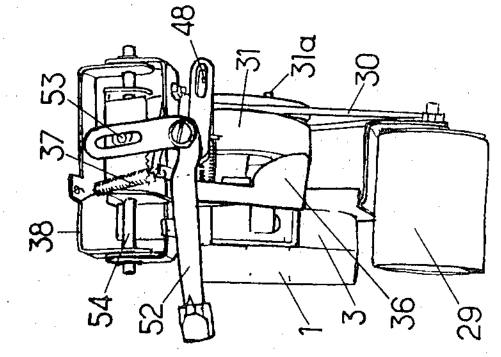
Figure 7:
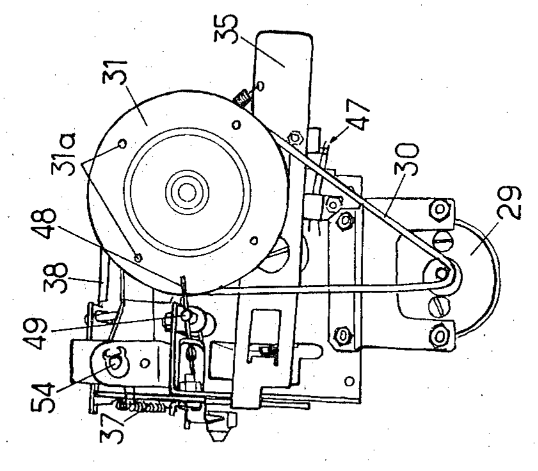
FIG. 7 is a rear view similar to FIG. 4 but showing it in position to drive the magnetic tape.

The casing half 1 of the cartridge is shown in FIG. 8. The casing half 3 is fastened to a plate 32 by an arrangement including balls 33 mounted on springs 34 and cooperating with recesses 6*a* (FIG. 3) in the arms 6 projecting from said casing half 3. To start up the apparatus a starting lever 35 is pushed downward. This lever is latched in "on" position by a catch 36 visible particularly in FIGS. 6 and 9 and actuated by a draw spring 37 which also biases a device 38 comprising both a pressure roller 39 and a support 40*a* for the reading head 40 fastened to the support 38 in a plane parallel to the plate 32 by a screw 41 screwed into the support 40*a* and passing freely through an oblong hole (not shown in the drawings) which permits the transverse displacement of the support 40*a* in order to select the different magnetic paths on the endless tape.

Figure 5:
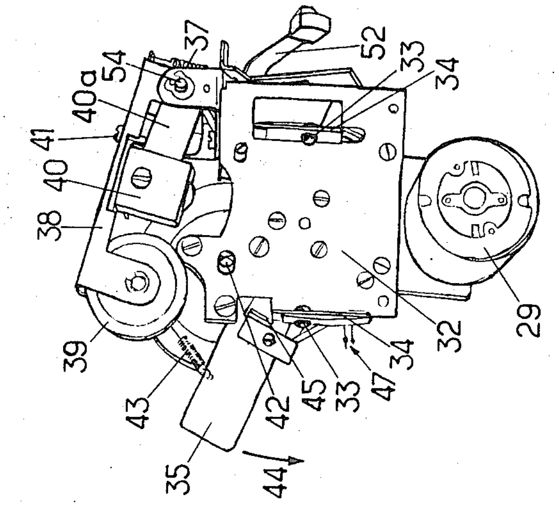
FIG. 5 is a front view of this mechanism in stop position before the cartridge is mounted on the drive means.
Figure 6:
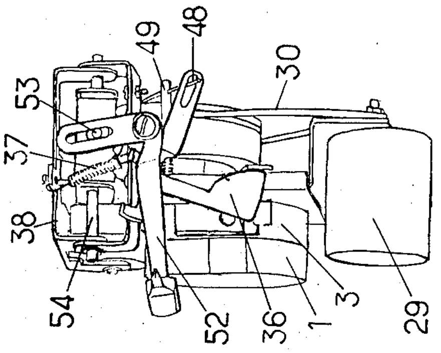
FIG. 6 is a side view of the same mechanism, showing in particular the release position of the automatic stopping means.
Figure 4:
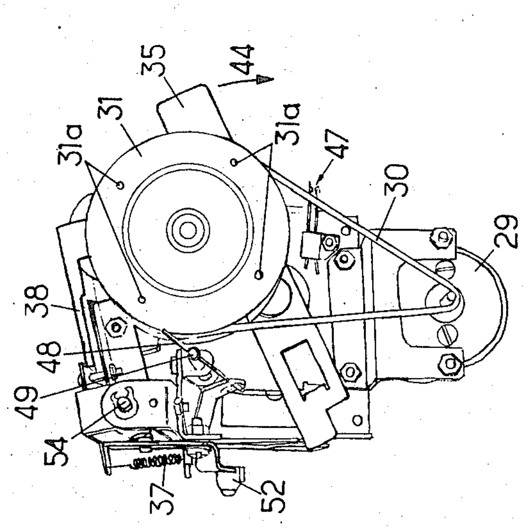
FIG. 4 is a rear view of the mechanism for driving the coil.

The pressure roller 39 is urged by the spring 43 into contact with the tape and presses it against the driving spindle 42, when the lever 35 is lowered in the same direction as the arrow 44 shown in FIG. 5.

Simultaneously the reading head 40 is pressed against the tape in the cartridge by passing it through the windows 19 and 20. The amount of pressure exerted by the magnetic head on the tape may be adjusted by screwing the screw 41 more or less into the support 40*a*.

It should be noted that the assembly of the mechanism is generally mounted in a casing provided with a recess having the shape of the cartridge and facilitating its mounting on the plate 32 of the mechanism. Projections 45 and 46 on the lever 35 simultaneously latch the balls 33 in the recesses 6*a* in the arms 6 of the cartridge in the lower position of the lever 35.

In the same position, the contacts 47 (FIGS. 4 and 7) are closed, thus energizing the motor driving the wheel 31 through the belt 30 and the preamplifier and amplifier circuit of the apparatus. The rod 48 of the feeler 49 then moves clear of the lugs 31*a* of the wheel 31, thus permitting movement of the tape within the cartridge.

Figure 10:
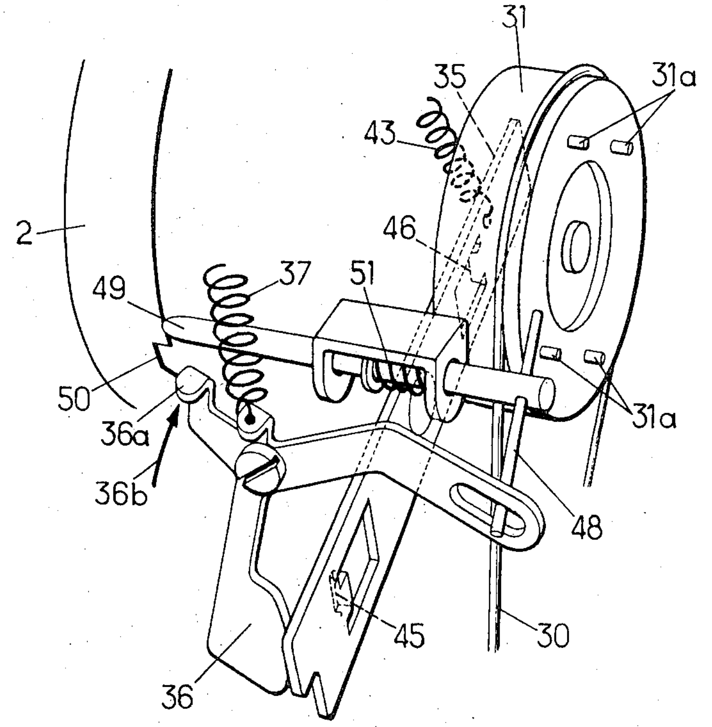
FIG. 10 is a perspective view also showing the method of operation of the latching and unlatching means permitting the automatic stopping.

The apparatus is also provided with an automatic stopping device relying on the stiffness of the strip, in which notches are provided such as the notch 50 visible in FIG. 10. The band may comprise one or several notches positioned at predetermined points therealong.

A spring 51 holds the feeler against the tape and when a notch in the tape comes opposite this feeler, the feeler moves toward the inside of the cartridge so that the rod 48 of this feeler 49 is struck by the lugs 31*a* of the wheel 31. The rotation of the rod 48 swings the latch 36, which in turn permits the lever 35 to rise to its upper position.

The pressure roller 39 and the magnetic head 40 are then no longer pressed against the tape and the contacts 47 open to stop the motor and cut off the supply of electricity thereto.

Moreover, the cartridge is released by arms 45 and 46 and may be withdrawn against the resistance of the springs 34.

It should be noted that, as has already been pointed out, it is possible at any moment to manually stop the apparatus by swinging the end 36*a* of the latch 36 in the direction of the arrow 36*b*.

Figure 11:
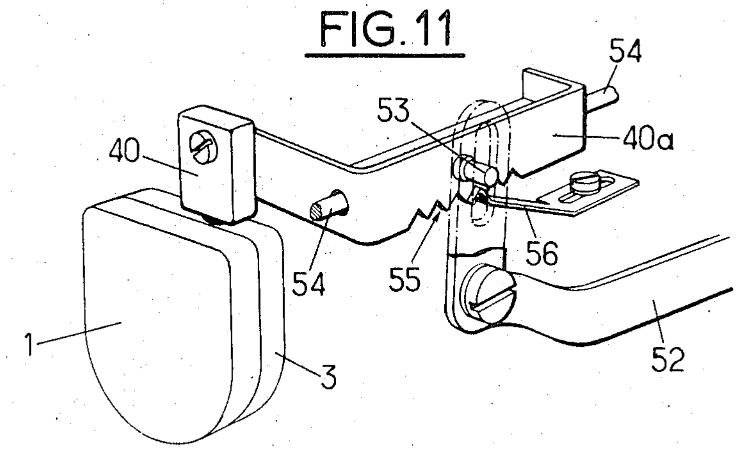
FIG. 11 is a perspective view of a device for selecting the magnetic paths by moving means fixed to said magnetic head and which comprises teeth assuring the accurate positioning of the magnetic head opposite the different magnetic paths.

The driving mechanism of the cartridge also comprises, in the embodiment described, a device for manually selecting a particular magnetic path, comprising a lever 52 (FIG. 11) which controls the displacement of the head 40 by a projection 53 fastened on the support 40*a* of the said magnetic head.

This support may be turned about an axle 54 which also serves to carry the support for the pressure roller 38. The distance between the magnetic paths, which may be also called the pitch, corresponding to the spacing of the teeth on a rack 45 formed in the support for the magnetic head 48, which rack cooperates with a leaf spring 56 mounted on the framework. This serves two other purposes, to wit, the application of the magnetic head against the tape by a pivotal movement about the axis 54 and the taking up of any play in the mechanism which positions said magnetic head and pressure foot.

It will of course be appreciated that the embodiment which has just been described may be modified as to detail without thereby departing from the basic principles of the invention as defined by the following claims.

What is claimed is:

1. In a tape recorder utilizing an endless tape and comprising a cartridge for holding said tape, together with a main assembly comprising a driving spindle adapted to project into said cartridge and drive said tape, a magnetic head and a pressure roller, the improvement according to which said tape is wound into a coil consisting essentially of radially contiguous turns, said coil having an innermost turn, an outermost turn, and a loop extending across the remaining turns of said coil to connect said innermost and outermost turns, said coil having a radius and said tape having a resilience such that any movement of the innermost turn is immediately transmitted to the outermost turn of the coil, and said cartridge comprises stationary pillar means located inside and cartridge and encircled by said tape, said pillar means being shaped to contact the innermost turn of said coil only at a plurality of circumferentially spaced points, and comprising a projecting part extending axially of said coil beyond one edge of said innermost turn for a distance at least equal to the width of said tape, with said connecting loop being looped about said projecting part, said cartridge further comprising a post separating the outermost turn of said coil from the remainder of said coil to form a space therebetween, and an outer wall defining openings for admitting said spindle into said space in a position parallel to said pillar and for admitting said magnetic head and pressure roller when said cartridge is in an operative position in said assembly, while said main assembly comprises a support carrying both said magnetic head and said pressure roller, said support being mounted to swing said pressure roller and magnetic head simultaneously into and away from positions urging said tape toward said spindle and post respectively.

2. Tape recorder as claimed in claim 1 in which said cartridge comprises two casing halves and snap fastening means for fastening said halves together.

3. Tape recorder as claimed in claim 2 in which the said half casing of the said cartridge supporting the said pillar means is internally provided at its rear portion with a guide finger for the outermost turn of the said magnetic tape.

4. Tape recorder as claimed in claim 2 in which said snap-fastening means comprise arms projecting from one of said halves, and the outer surfaces of said arms being recessed, and said main assembly carries spring-biassed balls positioned to snap into the recesses in said arms to fasten said cartridge to said main assembly.

5. Tape recorder as claimed in claim 4 comprising a feeler mounted on said assembly to project into said cartridge, and spring biassed against the edge of said tape, said tape edge being formed with at least one notch at a predetermined point therealong which is adapted to receive said feeler, said feeler being mounted to swing into said notch in response to the pressure of said spring when said notch reaches said feeler, and being connected to thereafter move said support with its pressure roller and head away from said tape.

6. Tape recorder as claimed in claim 5 comprising a motor, a wheel driven by said motor, and lugs carried by said wheel positioned to engage said feeler after it enters said notch and swing it to cause movement of said support.

7. Tape recorder as claimed in claim 5 in which said assembly comprises a motor, and a lever which is mounted to swing between an "off" position and an "on" position in which it closes a circuit for starting said motor and urges said head and pressure roller against said tape, and said lever carries two arms which latch said balls in said recesses when said lever is in said "on" position.

8. Tape recorder as claimed in claim 7 for use with a tape having a plurality of parallel magnetic tracks and including means for selecting an individual track, said means comprising a rack connected to move with the support for said magnetic head and a spring mounted on said main assembly to resiliently engage between the teeth of said rack.

9. Tape recorder as claimed in claim 1 in which said tape comprises a stiff supporting strip of a synthetic plastic material having its edges doubled over.

10. Tape recorder as claimed in claim 1 in which said tape is mounted on a stiff support made of a synthetic plastic material having a thickness appropriate to the radius of curvature of the turns of said coil.

11. Tape recorder as claimed in claim 1 in which said tape is mounted on a stiff support which is formed with longitudinal grooves separating a plurality of parallel magnetic paths on said tape.

12. Tape recorder as claimed in claim 1 in which said pillar means is shaped to guide said tape into a coil in which the innermost turn has one radial dimension greater than the others.

13. Tape recorder as claimed in claim 1 in which said tape has a resilience and is wound into a coil having a radius such that any movement of the innermost turn of said coil is immediately transmitted to its outermost turn.

* * * * *